(12) United States Patent
Hua et al.

(10) Patent No.: US 9,608,763 B2
(45) Date of Patent: Mar. 28, 2017

(54) ALL-OPTICAL TIME SLICE SWITCHING METHOD AND SYSTEM BASED ON TIME SYNCHRONIZATION

(71) Applicant: Tsinghua University, Beijing (CN)

(72) Inventors: Nan Hua, Beijing (CN); Xiaoping Zheng, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 14/439,658

(22) PCT Filed: Nov. 7, 2014

(86) PCT No.: PCT/CN2014/090582
§ 371 (c)(1),
(2) Date: Apr. 29, 2015

(87) PCT Pub. No.: WO2015/067211
PCT Pub. Date: May 14, 2015

(65) Prior Publication Data
US 2016/0036555 A1    Feb. 4, 2016

(30) Foreign Application Priority Data
Nov. 11, 2013  (CN) .......................... 2013 1 0556993

(51) Int. Cl.
*H04J 14/08*    (2006.01)
*H04Q 11/00*    (2006.01)
*H04L 7/00*    (2006.01)

(52) U.S. Cl.
CPC ............ *H04J 14/08* (2013.01); *H04J 14/083* (2013.01); *H04L 7/0041* (2013.01);
(Continued)

(58) Field of Classification Search
None
See application file for complete search history.

(56) References Cited

PUBLICATIONS

Shan et al., "Study on the Problem of Routing, Wavelength and Time slot Assignment toward Optical Time slot Switching Technology" IEEE 2010 Conference on Electronics and Information Engineering (ICEIE 2010), vol. 2, V2-335-339.*

* cited by examiner

*Primary Examiner* — Darren E Wolf
(74) *Attorney, Agent, or Firm* — Kile Park Reed & Houtteman LLC

(57) ABSTRACT

An all-optical time slice switching method based on time synchronization is provided. With the method, continuous data streams in an optical network are assembled to time domain periodic optical time slices and are transmitted in an asynchronous transmission mode. Network nodes obtain high precision synchronization time via a network and control optical switches to switch arriving optical time slices to a target port at precise time points periodically, therefore all-optical switching is implemented. When a connection request arrives, an available path, a wavelength and time slots to be occupied are calculated by a source node according to information on available time slots of the optical network, and the time slots are reserved by a connection management module. After the time slots are reserved, the source node send optical time slices carrying services periodically at reserved time slots. A destination node restores the optical time slices to the data streams.

8 Claims, 6 Drawing Sheets

(52) U.S. Cl.
CPC ....... *H04L 7/0075* (2013.01); *H04Q 11/0005* (2013.01); *H04Q 11/0066* (2013.01); *H04Q 2011/0033* (2013.01); *H04Q 2011/0039* (2013.01); *H04Q 2011/0045* (2013.01)

ALL-OPTICAL TIME SLICE SWITCHING METHOD AND SYSTEM BASED ON TIME SYNCHRONIZATION

CROSS-REFERENCE TO RELATED APPLICATION

This application claims priority to and benefits of Chinese Patent Application Serial No. 201310556993.6, filed with the State Intellectual Property Office of P. R. China on Nov. 11, 2013, the entire content of which is incorporated herein by reference.

FIELD

The present disclosure relates to an optical network communication technique field, and more particularly relates to an all-optical time slice switching method and system based on time synchronization.

BACKGROUND

Rapid growth of amount of data exchange brings a challenge to an electronic packet-switched network in terms of size, cost and energy consumption. The capacity of the network is eventually limited by potential bottlenecks in routers. Effective approaches to break the bottlenecks include introducing an all-optical switching technology.

However, existing optical circuit switching (OCS) can only exchange data at a wavelength granularity, leading to inefficient bandwidth utilization of the network. Optical packet switching (OPS) can exchange data at an ultrafine sub-wavelength granularity, but all-optical buffers and all-optical logic devices are required in OPS. Since all-optical buffers and all-optical logic devices are not mature and cannot be put into practice, the prospect of development in OPS is not promising in the foreseeable future. Optical burst switching (OBS) can be regarded as a combination of OCS and OPS while avoiding their shortcomings in a certain extent. Using out-of-band signaling, OBS can exchange data at a sub-wavelength granularity without all-optical buffers. However, like OPS, OBS cannot guarantee reliable data transmission due to packet loss. Even worse, without buffers the loss rate of packets at a heavy load could be much higher in OBS than that in conventional packet-switched networks, which limits the application of OBS.

Hence, in current all-optical switching networks, there are some defects in OCS, OPS and OBS and there is no all-optical switching technology for overcoming these defects.

SUMMARY

The present disclosure seeks to solve at least one of problems in the related art.

Thus, an objective of the present disclosure is aimed to provide an all-optical time slice switching method based on time synchronization.

In order to achieve the objective, the all-optical time slice switching method based on time synchronization according to embodiments of the present disclosure comprises: determining an OTSS connection between a source node and a destination node according to a state of time slots of an optical network, wherein the OTSS connection comprises wavelength links between adjacent optical switching nodes; transmitting data streams to the destination node via the OTSS connection by the source node, wherein time domain periodic OTSS frames are used to transmit the data streams on the wavelength links; each OTSS frame comprises variable-length time slices and OTSS frames on a same wavelength link comprises same time slices; each group of periodic time slices constitute an OTSS sub-wavelength optical channel; each optical switching node switches time slices arriving at an input fiber port to an output fiber port by an optical switch controller.

The all-optical time slice switching method based on time synchronization according to embodiments of the present disclosure may overcome the shortcomings in current switching technologies and realize reliable and flexible all-optical switching at a sub-wavelength granularity without participation of all-optical buffers and all-optical logic devices.

Moreover, the all-optical time slice switching method based on time synchronization according to embodiments of the present disclosure bears the following additional technical features.

In an embodiment of the present disclosure, the method further comprises obtaining a high-precision time signal by each optical switching node from a time server to synchronize a local time of the optical switching node, wherein the time server determines the high-precision time signal via a satellite or a network.

In an embodiment of the present disclosure, the method further comprises if a state of time slots on a wavelength link changes, flooding information of the time slots within a period on the wavelength link throughout the optical network by optical switching nodes at each end of the wavelength link so as to determine time slots available to the OTSS connection according to a changed state of the time slots, wherein the information comprises start/end time of time slices, slot occupying/releasing and services carried on time slices.

In an embodiment of the present disclosure, determining an OTSS connection between a source node and a destination node comprises: if a connection request arrives, calculating an available path, a wavelength and start/end time of one or more groups of periodic time slots to be occupied on each wavelength link of the available path by the source node according to the state of time slots of the optical network, information of the destination node and a requested bandwidth; establishing the OTSS connection by the source node according to the available path, the wavelength and the start/end time of one or more groups of periodic time slots to be occupied on each wavelength link of the available path.

In an embodiment of the present disclosure, establishing the OTSS connection comprises: transmitting a message for reserving time slots and information on the available path, the wavelength and the start/end time of one or more groups of periodic time slots to be occupied on each wavelength link of the available path to other optical switching nodes on the available path by the source node until the message is received by the destination node or a failure occurs; after the message is received by the other optical switching nodes on the available path, reserving the periodic time slots by each optical switching node other than the destination node on the available path for the port of the output fiber connected to a next optical switching node on the available path according to the information on the available path, the wavelength and the start/end time of one or more groups of periodic time slots to be occupied on each wavelength link of the available path, where reserved time slots are not allowed to be occupied by other connections within a reserved period; after the message is received by the destination node, transmitting a confirming message on the available path by the destination node until the confirming message is received by the source node; after receiving the confirming message, configuring the optical switch controller by each optical switching node other than the destination node on the available path, wherein configuring the optical switch controller comprises setting periodic switching points according to the start/end time of one or more groups of periodic time slots to be occupied on each wavelength link of the available path.

In an embodiment of the present disclosure, transmitting data streams to the destination node via the OTSS connection by the source node comprises: recoding the data streams by the source node to obtain recoded data streams according to a line rate of a wavelength channel on the available path, wherein recoding the data streams comprises remodulating the data streams and assembling them into an OTSS sub-wavelength optical channel according to the start/end time of one or more groups of periodic time slots to be occupied on the first wavelength link of the available path; transmitting the recoded data streams to a next optical switching node on the available path by the source node at the start time of one or more groups of periodic time slots to be occupied on the first wavelength link of the available path; switching optical switches by each optical switching node on the available path at the switching points set by the optical switch controller to switch periodic time slices arriving at the input fiber port to the output fiber port.

In an embodiment of the present disclosure, calculating an available path, a wavelength and start/end time of one or more groups of periodic time slots to be occupied on each wavelength link of the available path by the source node comprises: obtaining a candidate path between the source node and the destination node; calculating combined available time slots on the candidate path according to a propagation delay and a state of time slots on each wavelength link of the candidate path; if a total data transmission bandwidth of the combined available time slots on the candidate path is greater than or equal to the requested bandwidth, determining the candidate path to be the available path and determining the wavelength and the start/end time of one or more groups of periodic time slots to be occupied on each wavelength link of the available path according to the combined available time slots on the available path; otherwise, repeating above steps until the available path is determined.

In an embodiment of the present disclosure, calculating combined available time slots on the candidate path comprises: for each wavelength link of the candidate path, defining a set of time slots occupied on the wavelength link according to the state of time slots on the wavelength link as $\psi_i = \cup_{k=1}^{K_i}(t_{i_k}^{start}, t_{i_k}^{end})$, where $\psi_i$ is the set of time slots occupied on wavelength link $e_i$, $t_{i_k}^{start}$ and $t_{i_k}^{end}$ represent a start/end time of a $k^{th}$ time slot occupied on wavelength link $e_i$ respectively, and $K_i$ is a number of occupied time slots on wavelength link $e_i$; obtaining a combined occupied time slots using a time-slice shift and combination algorithm by $H_1$-times iterations as:

$$\psi_i' = \cup_{k=1}^{K_i}(t_{i_k}^{start} - T_d^c, t_{i_k}^{end} - T_d^c); \quad (1)$$

$$\psi_c \leftarrow \psi_c \cup \psi_i'; \quad (2)$$

$$T_d^c \leftarrow T_d^c + T_d^i; \quad (3)$$

where $H_1$ is a number of wavelength links of the candidate path, $T_d^i$ is a propagation delay of wavelength link $e_i$, $\psi_c$ and $T_d^c$ represent the combined occupied time slots and an accumulative propagation delay respectively, the initial value of $\psi_c$ is an empty set and the initial value of $T_d^c$ is 0 and $i=1\sim H_1$; obtaining the combined available time slots as $\psi_c' = \overline{\psi_c}$.

In an embodiment of the present disclosure, determining the wavelength and the start/end time of one or more groups of periodic time slots to be occupied on each wavelength link of the available path according to the combined available time slots on the available path comprises: selecting one or more groups of periodic available time slots $\psi_o = \cup_{n=1}^{N}(t_n^{start}, t_n^{end})$ from the combined available time slots on the available path as one or more groups of periodic available time slots to be occupied on the first wavelength link of which a total data transmission bandwidth is greater than or equal to the requested bandwidth, where $t_n^{start}$, $t_n^{end}$ and N represent a start/end time of an $n^{th}$ available time slot on the first wavelength link and a number of available time slots on the first wavelength link respectively; calculating start/end time of one or more groups of periodic time slots to be occupied on other wavelength links of the available path according to one or more groups of periodic available time slots to be occupied on the first wavelength link as:

$$t_{j_n}^{start} \leftarrow t_n^{start} + \sum_{k=1}^{j-1} T_d^k, \; t_{j_n}^{end} \leftarrow t_n^{end} + \sum_{k=1}^{j-1} T_d^k,$$

where $t_{j_n}^{start}$ and $t_{j_n}^{end}$ represent a start/end time of an $n^{th}$ available time slot on wavelength link $e_j$ respectively, $j=2\sim H_2$, $H_2$ is a number of wavelength links of the available path and $T_d^k$ is a propagation delay of wavelength link $e_k$.

In an embodiment of the present disclosure, time slices are separated from each other by a guard time and the method further comprises: when a time synchronization error or a propagation delay variation exceeds the guard time so that a conflict between time slices occurs, delaying the time slices by an apparatus in an electrical domain or an optical domain at output fiber ports of conflicting optical switching nodes.

Another objective of the present disclosure is aimed to provide an all-optical time slice switching system based on time synchronization, which comprises: a determining module, configured for determining an OTSS connection between the source node and the destination node according to a state of time slots of an optical network, wherein the OTSS connection comprises wavelength links between adjacent optical switching nodes; a transmitting module, configured for using time domain periodic OTSS frames to transmit data streams on the wavelength links, wherein each OTSS frame comprises variable-length time slices and OTSS frames on a same wavelength link comprises same time slices, each group of periodic time slices constitute an OTSS sub-wavelength optical channel, and each optical switching node switches time slices arriving at an input fiber port to an output fiber port by an optical switch controller.

These additional aspects and advantages of the present disclosure will become apparent from the following descriptions and more readily appreciated from the embodiments of the present disclosure.

BRIEF DESCRIPTION OF THE DRAWINGS

These and/or additional aspects and advantages of the present disclosure will become apparent and more readily appreciated from the following descriptions of embodiments made with reference to the drawings, in which.

DETAILED DESCRIPTION

Figure 1:
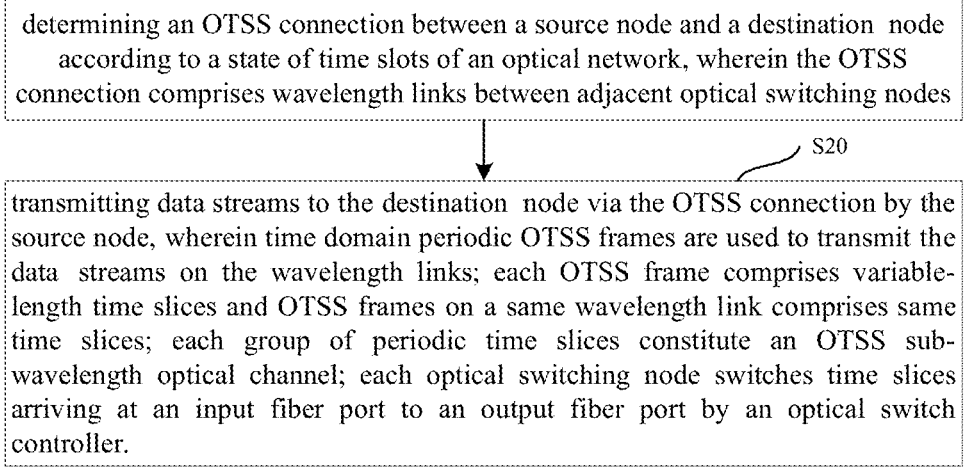
FIG. 1 is a flow chart of an all-optical time slice switching method based on time synchronization according to embodiments of the present disclosure.

Reference will be made in detail to embodiments of the present disclosure, wherein the same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

As shown in FIG. 1, the all-optical time slice switching method based on time synchronization according to embodiments of the present disclosure comprises the following steps.

At step S10: determining an OTSS connection between a source node and a destination node according to a state of time slots of an optical network, wherein the OTSS connection comprises wavelength links between adjacent optical switching nodes;

At step S20: transmitting data streams to the destination node via the OTSS connection by the source node, wherein time domain periodic OTSS (optical time slice switching) frames are used to transmit the data streams on the wavelength links; each OTSS frame comprises variable-length time slices and OTSS frames on a same wavelength link comprises same time slices; each group of periodic time slices constitute an OTSS sub-wavelength optical channel; each optical switching node switches time slices arriving at an input fiber port to an output fiber port by an optical switch controller.

The all-optical time slice switching method based on time synchronization according to embodiments of the present disclosure may realize reliable and flexible all-optical switching at a sub-wavelength granularity without all-optical buffers and all-optical logic devices.

In an embodiment of the present disclosure, the method further comprises obtaining a high-precision time signal by each optical switching node from a time server to synchronize a local time of the optical switching node, wherein the time server determines the high-precision time signal via a satellite or a network.

In an embodiment of the present disclosure, the method further comprises if a state of time slots on a wavelength link changes, flooding information of the time slots within a period on the wavelength link throughout the optical network by optical switching nodes at each end of the wavelength link so as to determine time slots available to the OTSS connection according to a changed state of the time slots, wherein the information comprises start/end time of time slices, slot occupying/releasing and services carried on time slices.

In an embodiment of the present disclosure, determining an OTSS connection between a source node and a destination node comprises: if a connection request arrives, calculating an available path, a wavelength and start/end time of one or more groups of periodic time slots to be occupied on each wavelength link of the available path by the source node according to the state of time slots of the optical network, information of the destination node and a requested bandwidth; establishing the OTSS connection by the source node according to the available path, the wavelength and the start/end time of one or more groups of periodic time slots to be occupied on each wavelength link of the available path.

In an embodiment of the present disclosure, establishing the OTSS connection comprises: transmitting a message for reserving time slots and information on the available path, the wavelength and the start/end time of one or more groups of periodic time slots to be occupied on each wavelength link of the available path to other optical switching nodes on the available path by the source node until the message is received by the destination node or a failure occurs; after the message is received by the other optical switching nodes on the available path, reserving the periodic time slots by each optical switching node other than the destination node on the available path for the port of the output fiber connected to a next optical switching node on the available path according to the information on the available path, the wavelength and the start/end time of one or more groups of periodic time slots to be occupied on each wavelength link of the available path, where reserved time slots are not allowed to be occupied by other connections within a reserved period; after the message is received by the destination node, transmitting a confirming message on the available path by the destination node until the confirming message is received by the source node; after receiving the confirming message, configuring the optical switch controller by each optical switching node other than the destination node on the available path, wherein configuring the optical switch controller comprises setting periodic switching points according to the start/end time of one or more groups of periodic time slots to be occupied on each wavelength link of the available path.

In an embodiment of the present disclosure, transmitting data streams to the destination node via the OTSS connection by the source node comprises: recoding the data streams by the source node to obtain recoded data streams according to a line rate of a wavelength channel on the available path, wherein recoding the data streams comprises remodulating the data streams and assembling them into an OTSS sub-wavelength optical channel according to the start/end time of one or more groups of periodic time slots to be occupied on the first wavelength link of the available path; transmitting the recoded data streams to a next optical switching node on the available path by the source node at the start time of one or more groups of periodic time slots to be occupied on the first wavelength link of the available path; switching by each optical switching node on the available path optical switches at the switching points set by the optical switch controller to switch periodic time slices arriving at the input fiber port to the output fiber port.

In an embodiment of the present disclosure, calculating an available path, a wavelength and start/end time of one or more groups of periodic time slots to be occupied on each wavelength link of the available path by the source node comprises: obtaining a candidate path between the source node and the destination node; calculating combined available time slots on the candidate path according to a propagation delay and a state of time slots on each wavelength link of the candidate path; if a total data transmission bandwidth of the combined available time slots on the candidate path is greater than or equal to the requested bandwidth, determining the candidate path to be the available path and determining the wavelength and the start/end time of one or more groups of periodic time slots to be occupied on each wavelength link of the available path according to the combined available time slots on the available path; otherwise, repeating above steps until the available path is determined.

In an embodiment of the present disclosure, calculating combined available time slots on the candidate path comprises: for each wavelength link of the candidate path, defining a set of time slots occupied on the wavelength link according to the state of time slots on the wavelength link as $\psi_i = \cup_{k=1}^{K_i}(t_{i_k}^{start}, t_{i_k}^{end})$, where $\psi_i$ is the set of time slots occupied on wavelength link $e_i$, $t_{i_k}^{start}$ and $t_{i_k}^{end}$ represent a start/end time of a $k^{th}$ time slot occupied on wavelength link $e_i$, respectively and $K_i$ is a number of occupied time slots on wavelength link $e_i$; obtaining a combined occupied time slots using a time-slice shift and combination algorithm by $H_1$-times iterations as:

$$\psi_i' = \cup_{k=1}^{K_i}(t_{i_k}^{start} - T_d^c, t_{i_k}^{end} - T_d^c); \quad (1)$$

$$\psi_c \leftarrow \psi_c \cup \psi_i'; \quad (2)$$

$$T_d^c \leftarrow T_d^c + T_d^i; \quad (3)$$

where $H_1$ is a number of wavelength links of the candidate path, $T_d^i$ is a propagation delay of wavelength link $e_i$, $\psi_c$ and $T_d^c$ represent the combined occupied time slots and an accumulative propagation delay respectively, the initial value of $\psi_c$ is an empty set and the initial value of $T_d^c$ is 0 and $i=1 \sim H_1$; obtaining the combined available time slots as $\psi_c' = \overline{\psi_c}$.

In an embodiment of the present disclosure, determining the wavelength and the start/end time of one or more groups of periodic time slots to be occupied on each wavelength link of the available path according to the combined available time slots on the available path comprises: selecting one or more groups of periodic available time slots $\psi_o = \cup_{n=1}^{N} (t_n^{start}, t_n^{end})$ from the combined available time slots on the available path as one or more groups of periodic available time slots to be occupied on the first wavelength link of which a total data transmission bandwidth is greater than or equal to the requested bandwidth, where $t_n^{start}$, $t_n^{end}$ and N represent a start/end time of an $n^{th}$ available time slot on the first wavelength link and a number of available time slots on the first wavelength link respectively; calculating start/end time of one or more groups of periodic time slots to be occupied on other wavelength links of the available path according to one or more groups of periodic available time slots to be occupied on the first wavelength link as:

$$t_{j_n}^{start} \leftarrow t_n^{start} + \sum_{k=1}^{j-1} T_d^k, \quad t_{j_n}^{end} \leftarrow t_n^{end} + \sum_{k=1}^{j-1} T_d^k,$$

where $t_{j_n}^{start}$ and $t_{j_n}^{end}$ represent a start/end time of an $n^{th}$ available time slot on wavelength link $e_j$ respectively, $j=2 \sim H_2$, $H_2$ is a number of wavelength links of the available path and $T_d^c$ is a propagation delay of wavelength link $e_k$.

In an embodiment of the present disclosure, time slices are separated from each other by a guard time and the method further comprises: when a time synchronization error or a propagation delay variation exceeds the guard time so that a conflict between time slices occurs, delaying the time slices by an apparatus in an electrical domain or an optical domain at output fiber ports of the conflicting optical switching nodes.

In order to make those skilled in the art better understand the present disclosure, the present disclosure will be described in detail with reference to FIG. 2 to FIG. 7.

Figure 2:
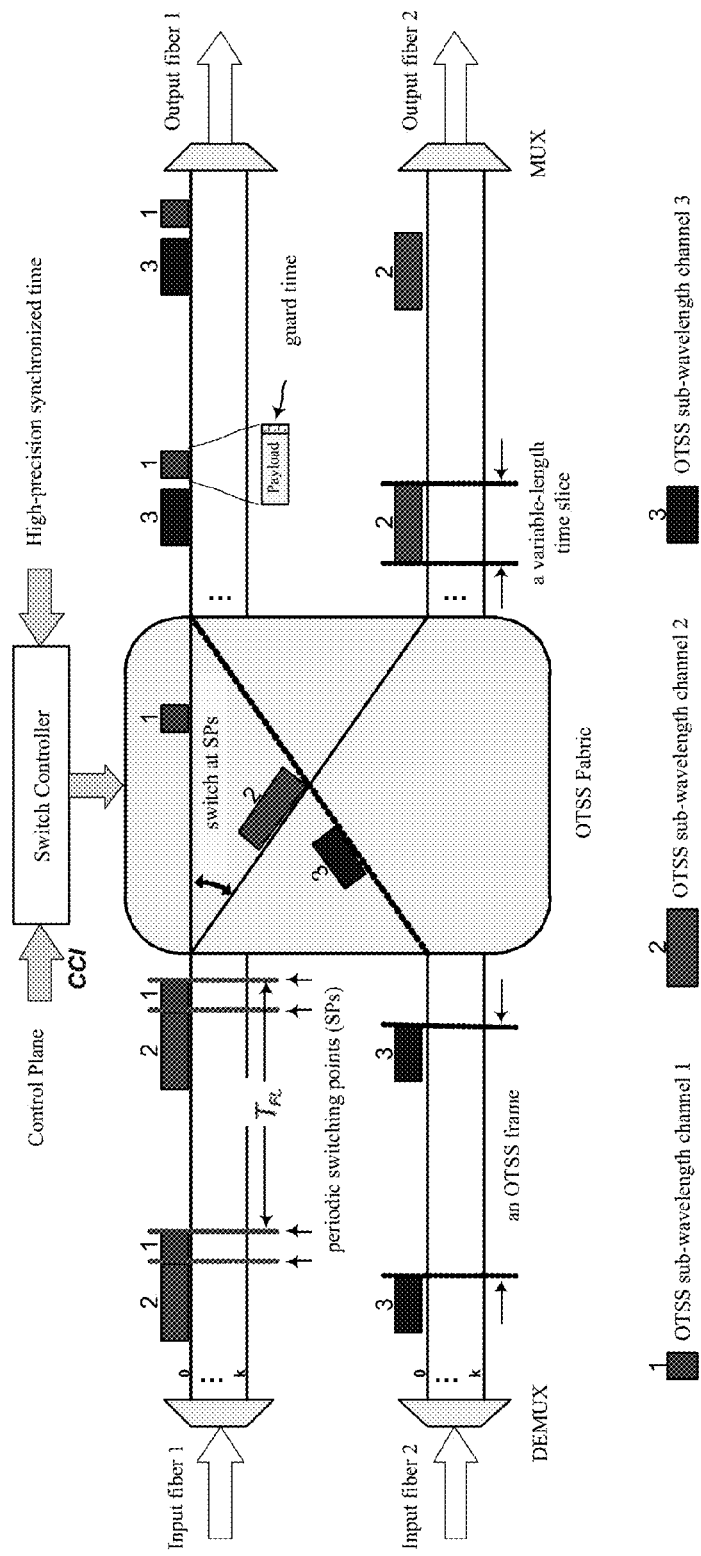
FIG. 2 is a schematic view of a structure of periodic time slices in OTSS and an asynchronous switching mode of OTSS.

FIG. 2 illustrates a structure of periodic time slices in OTSS based on time synchronization and an asynchronous switching mode of OTSS. The core of OTSS is an optical switch controller and an OTSS switching matrix in FIG. 2, where the optical switch controller controls the OTSS switching matrix to reverse high-speed optical switches at periodic switching points such that time slices arriving at a wavelength channel on an input fiber are switched to an output fiber port in an asynchronous mode. FIG. 2 illustrates three OTSS channels (1, 2 and 3) having sub-wavelength granularity being switched in the OTSS switching matrix. The OTSS channels 1 and 2 arrive at wavelength link $\lambda_0$ on input fiber one and the OTSS channel 3 arrives at wavelength link $\lambda_0$ on input fiber two. Each OTSS channel is organized into periodic OTSS time slices with a period of $T_{FL}$ namely a length of an OTSS frame. If a state of time slots on a wavelength link changes, optical switching nodes at each end of the wavelength link flood information of time slots within a period on the wavelength link throughout the optical network, where the information comprises start/end time of time slices, slot occupying/releasing and services carried on time slices. Time slices are separated from each other by a guard time which may avoid a conflict between time slices due to a tiny time synchronization error or propagation delay variation. When the time synchronization error or propagation delay variation exceeds the guard time so that a conflict between time slices occurs, delaying the time slices by an apparatus in an electrical domain or an optical domain at output fiber ports of conflicting optical switching nodes to avoid the conflict.

Figure 3:
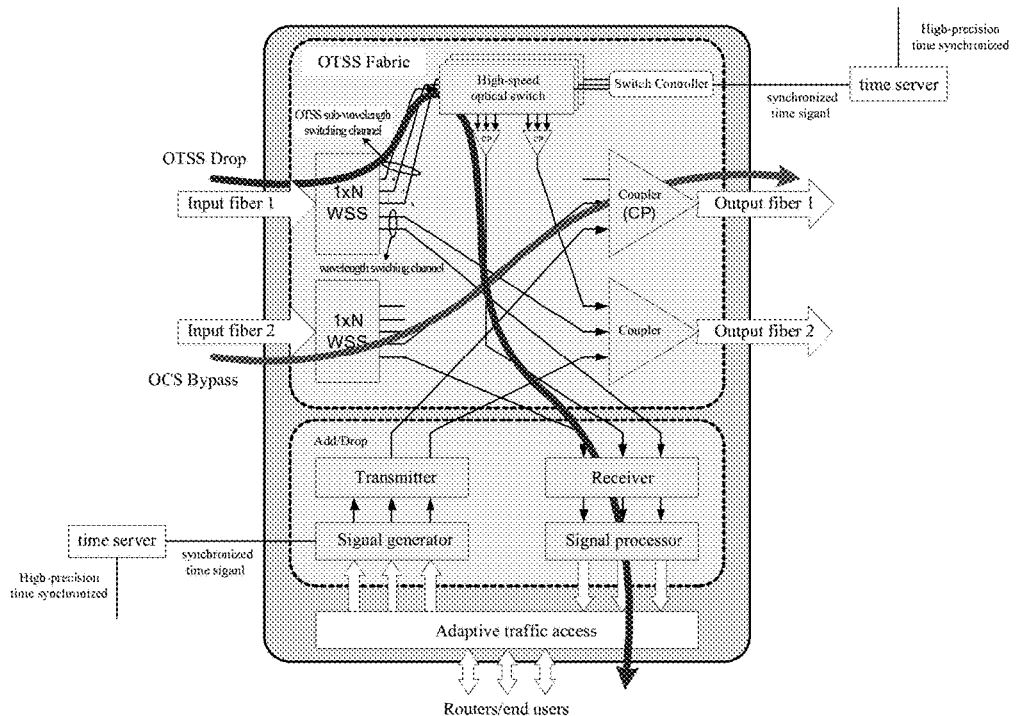
FIG. 3 is a schematic view of a structure of an optical switching node supporting both OTSS and conventional wavelength switching technologies.

FIG. 3 illustrates a structure of an optical switching node supporting both OTSS and conventional wavelength switching technologies. FIG. 3 illustrates an example of two OTSS connections, an OTSS Drop at sub-wavelength granularity and an OCS Bypass at wavelength granularity. Both signal generation and control of high-speed optical switches are based on a high-precision synchronized time signal obtained from a time server. The start/end time of each time slot is configured as a switching point (SP). Controlled by the optical switch controller, the OTSS switching matrix reverses optical switches at periodic switching points such that time slices arriving at a wavelength channel on an input fiber are switched to a target output fiber port in an asynchronous mode.

As shown in FIG. 2 and FIG. 3, the optical switch controller obtains calculated switching points from a network control plane via a connection control interface (CCI) and obtains a high-precision synchronized time signal from a time server to synchronize a local time of an optical switching node connected to the optical switch controller.

When a connection request with a destination node being Node D arrives at Node S, the procedure for calculating a path, a wavelength and time slots allocation is conducted by the source node (Node S). An available path, a wavelength and start/end time of one or more groups of periodic time slots to be occupied on each wavelength link of the available path are calculated according to the state of time slots of the optical network and a requested bandwidth. In the embodiment, available path S-A-D may be obtained by a shortest path algorithm and available wavelength $\lambda_0$ may be obtained by a First-Fit algorithm. Then, available time slots on wavelength $\lambda_0$ on path S-A-D may be calculated by a time-slice shift and combination algorithm.

Figure 4:
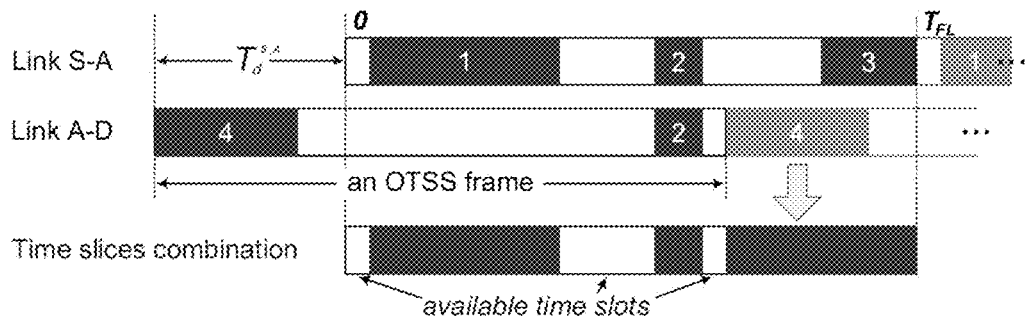
FIG. 4 is a principle diagram of a time-slice shift and combination algorithm.

FIG. 4 illustrates a principle diagram of a time-slice shift and combination algorithm. Take path S-A-D for example, a method for calculating available time slots on the path is described. More specifically, firstly, a forward shift of the propagation delay of wavelength link S-A ($T_d^{S,A}$, the wavelength is $\lambda_0$) is made on all the time slices on wavelength link A-D (the wavelength is $\lambda_0$) by the time-slice shift and combination algorithm. Then, all the time slices on wavelength link S-A (the wavelength is $\lambda_0$) are combined with those on wavelength link A-D (the wavelength is $\lambda_0$) after the forward shift. Finally, combined available time slots are calculated. (1) if a total data transmission bandwidth of the combined available time slots is less than the requested bandwidth such that there is no satisfactory available time slot(s) on path S-A-D (the wavelength is $\lambda_0$), a calculation of available time slots may be made on another path by using the time-slice shift and combination algorithm or a failure message of the path calculation may be returned; (2) if the total data transmission bandwidth of the combined available time slots is no less than the requested bandwidth, one or more groups of available time slots of which the total data transmission bandwidth is no less than the requested bandwidth are selected. Start/end time of the one or more groups of available time slots are returned such that start/end time of available time slots on wavelength link S-A (the wavelength is $\lambda_0$) are obtained. Shift the start/end time backward a propagation delay of wavelength link S-A ($T_d^{S,A}$), then start/end time of available time slots on wavelength link A-D (the wavelength is $\lambda_0$) are obtained. Thus, the procedure for calculating a path, a wavelength and time slots allocation is finished.

Figure 5:
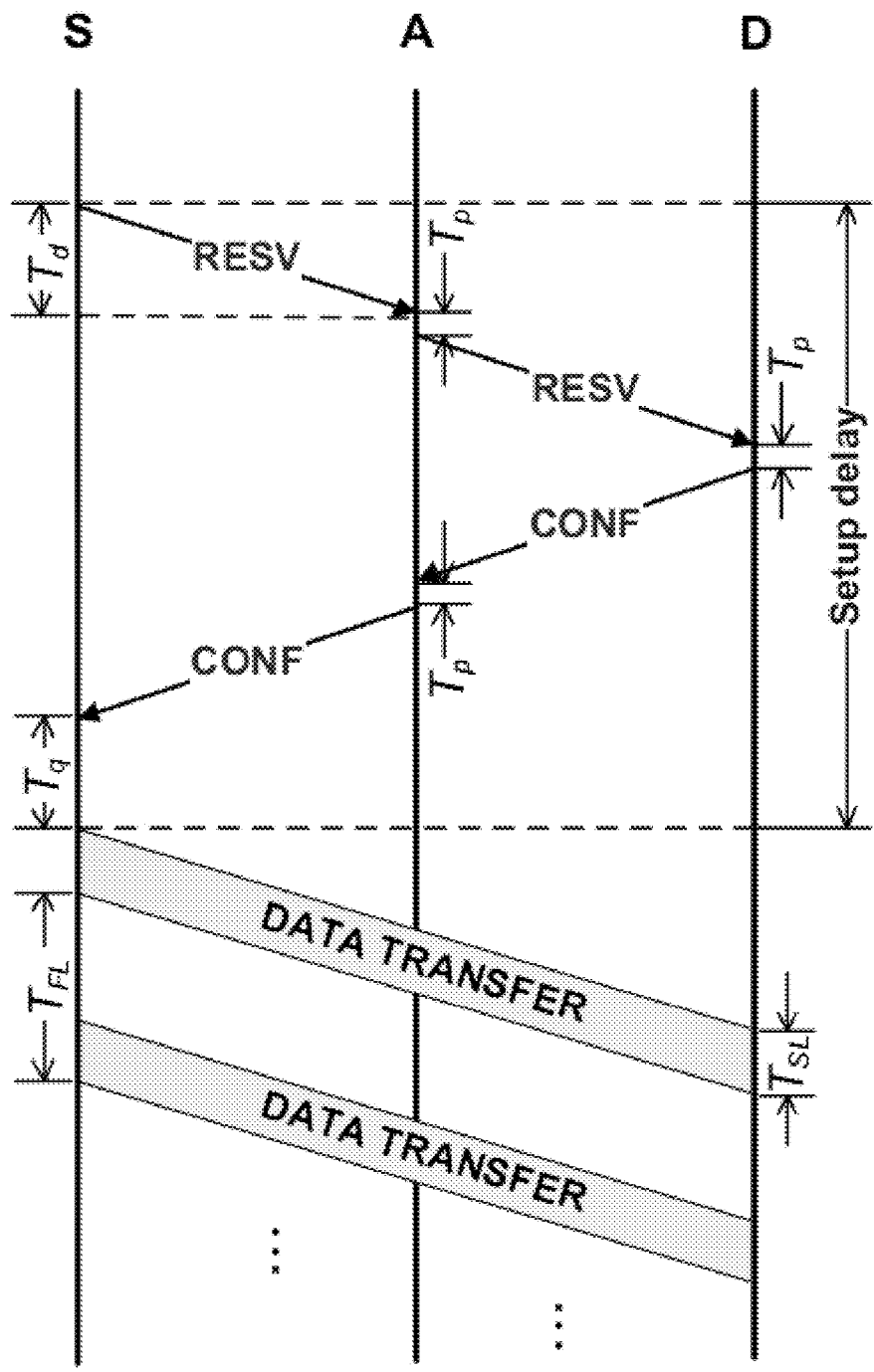
FIG. 5 is a flow chart of signaling messages in OTSS.

FIG. 5 illustrates a flow chart of signaling messages in OTSS. Take path S-A-D for example, the procedure for reserving time slots and the procedure of data transmission are described. A connection establishment is started by a connection management module of the source node (Node S). Node S transmits a "RESV" message on path S-A-D. The information including a path (S-A-D), a wavelength ($\lambda_0$) and start/end time of the periodic time slots to be occupied on wavelength link S-A and wavelength link A-D is sent to the nodes A and D until the "RESV" message is received by Node D or a failure occurs. The periodic time slots on wavelength link S-A ($\lambda_0$) to be occupied for a port connected to Node A are reserved by Node S, and the reserved time slots are not allowed to be occupied by other connections within the reserved period. After the "RESV" message is received by Node A, the periodic time slots on wavelength link A-D ($\lambda_0$) to be occupied for a port connected to Node D are reserved by Node A, and the reserved time slots are not allowed to be occupied by other connections within the reserved period.

After the "RESV" message is received by Node D, Node D transmits a "CONF" confirming message on path D-A-S till the "CONF" message is received by Node A. After receiving the "CONF" message, an operation for configuring optical switch controllers is conducted by Node A or Node S via a connection control interface to set periodic switching points (SP) according to start/end time of time slots carried by the "RESV" message. The connection establishment is finished after the "CONF" message is received by Node S and the operation for configuring optical switch controllers is conducted by Node S, and then the data transmission is started.

When transmitting data streams, the data streams are recoded by Node S to obtain recoded data streams according to a line rate of wavelength channel $\lambda_0$, the data streams are remodulated and then assembled into an OTSS sub-wavelength optical channel whose time slices period is $T_{FL}$, according to a length of calculated time slots to be occupied, and then the recoded data streams are sent to Node A on wavelength channel $\lambda_0$, at calculated start time of time slots on wavelength link S-A. Node A reverses optical switches at the periodic switching points set by the optical switch controller such that periodic time slices on wavelength channel $\lambda_0$ sent by Node S are switched to the target output fiber port connected to Node D.

Figure 6:
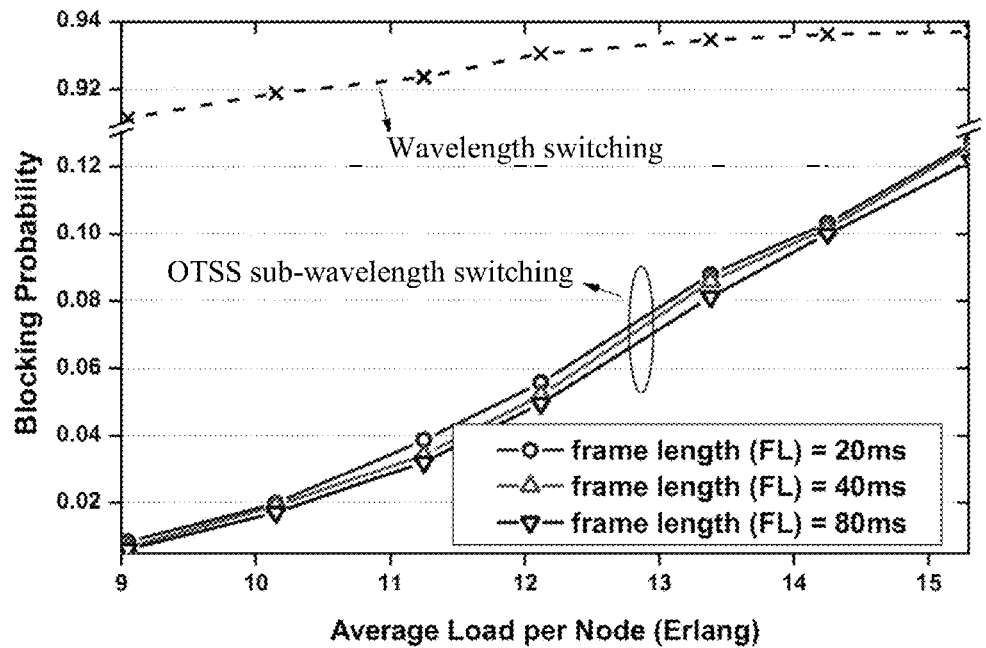
FIG. 6 is a diagram showing the blocking performance of OTSS compared to that of a conventional wavelength switching technology.
Figure 7:
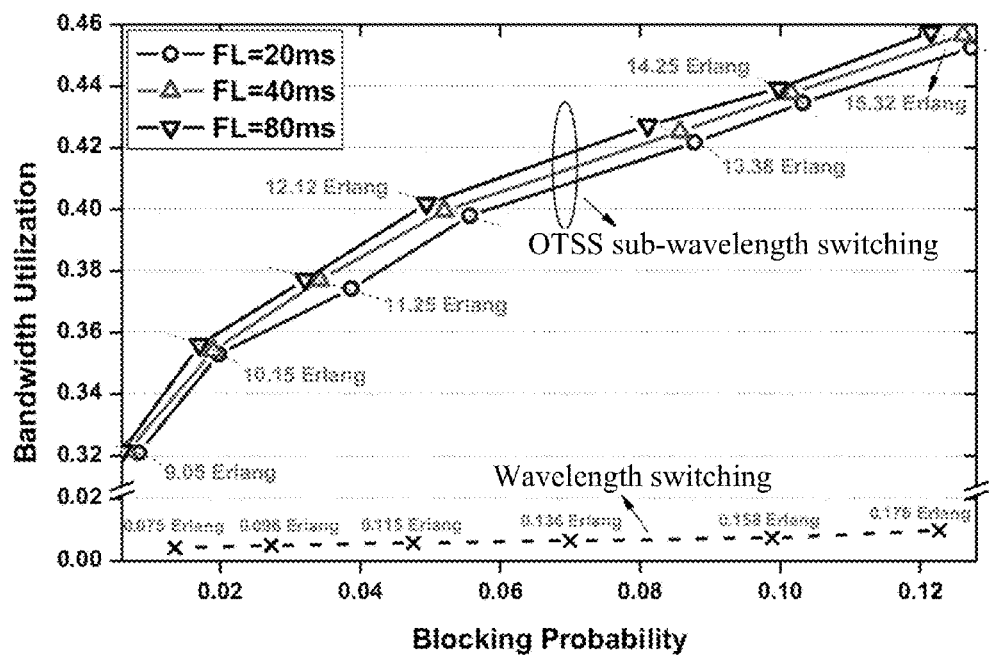
FIG. 7 is a diagram showing the bandwidth utilization of OTSS compared to that of a conventional wavelength switching technology.

FIG. 6 and FIG. 7 illustrate diagrams showing simulation results of OTSS compared to that of a conventional wavelength switching technology. The simulation is based on an NSFNET topology with 14 nodes and 21 links, and the line rate of each wavelength channel is 40 Gb/s. Connection requests arrive in a Poisson process and are uniformly distributed among all the nodes with a single requested bandwidth of 1 Gb/s. FIG. 6 illustrates the blocking performance of OTSS compared to that of a conventional wavelength switching technology. In FIG. 6, it can be seen that the blocking probability of the conventional wavelength switching technology is greater than 90% in a given load range, which is unacceptable in practice. The blocking probability of OTSS is no greater than 13% in the same load range, and the performance of OTSS is good. FIG. 7 illustrates the bandwidth utilization of OTSS compared to that of a conventional wavelength switching technology. It can be seen that the bandwidth utilization of OTSS is greater than that of the conventional wavelength switching technology with the same blocking probability. In a given blocking probability range (0-13%), the bandwidth utilization of OTSS varies from 32% to 46% while that of the conventional wavelength switching technology is no greater than 1%.

The present disclosure provides an all-optical time slice switching system based on time synchronization.

Figure 8:
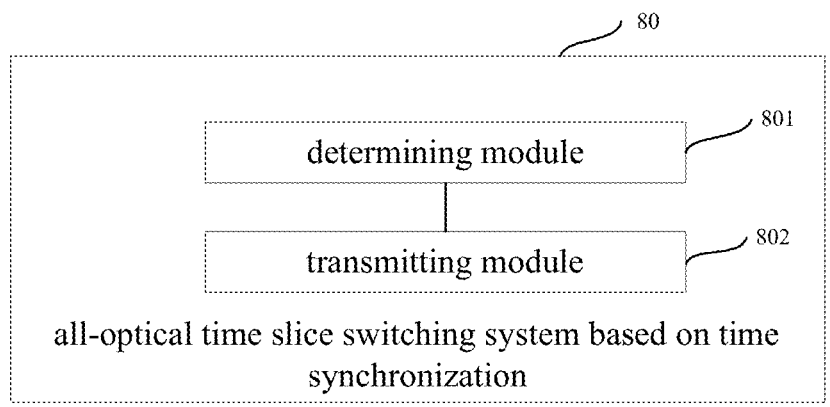
FIG. 8 is a schematic view of an all-optical time slice switching system based on time synchronization according to embodiments of the present disclosure.

As shown in FIG. 8, the system 80 comprises: a determining module 801 and a transmitting module 802.

The determining module 801 is configured for: determining an OTSS connection between the source node and the destination node according to a state of time slots of an optical network, wherein the OTSS connection comprises wavelength links between adjacent optical switching nodes;

The transmitting module 802 is configured for: using time domain periodic OTSS frames to transmit data streams on the wavelength links, wherein each OTSS frame comprises variable-length time slices and OTSS frames on a same wavelength link comprises same time slices, each group of periodic time slices constitute an OTSS sub-wavelength optical channel, and each optical switching node switches time slices arriving at an input fiber port to an output fiber port by an optical switch controller. The data streams are transmitted from source node to the destination node via the OTSS connection by the transmitting module 802.

The all-optical time slice switching system based on time synchronization according to embodiments of the present disclosure may realize reliable and flexible all-optical switching at a sub-wavelength granularity without all-optical buffers and all-optical logic devices.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations in which the order of execution may differ from that which is depicted in the flow chart, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. An all-optical time slice switching method based on time synchronization, comprising:

determining an OTSS connection between a source node and a destination node according to a state of time slots of an optical network, wherein the OTSS connection comprises wavelength links between adjacent optical switching nodes, wherein determining includes:

determining an available path between the source node and the destination node;

determining an available wavelength on the available path; and determining combined available time slots on the available path, including:

for each wavelength link of the available path, defining a set of time slots occupied on the wavelength link according to a state of time slots on the wavelength link as $\psi_i = \bigcup_{k=1}^{K_i}(t_{i_k}^{start}, t_{i_k}^{end})$, where $\psi_i$ is the set of time slots occupied on wavelength link $e_i$, $t_{i_k}^{start}$ and $t_{i_k}^{end}$ represent a start/end time of a $k^{th}$ time slot occupied on wavelength link $e_i$ respectively and $K_i$ is a number of occupied time slots on wavelength link $e_i$;

obtaining a combined occupied time slots using a time-slice shift and combination algorithm by $H_1$-times iterations as:

$$\psi_i' = \bigcup_{k=1}^{K_i}(t_{i_k}^{start} - T_d^c, t_{i_k}^{end} - T_d^c); \qquad (1)$$

$$\psi_c \leftarrow \psi_c \cup \psi_i'; \qquad (2)$$

$$T_d^c \leftarrow T_d^c + T_d^i; \qquad (3)$$

where $H_1$ is a number of wavelength links of the available path, $T_d^i$ is a propagation delay of wavelength link $e_i$, $\psi_c$ and $T_d^c$ represent the combined occupied time slots and an accumulative propagation delay respectively, the initial value of $\psi_c$ is an empty set and the initial value of $T_d^c$ is 0 and i=1~$H_1$;

obtaining the combined available time slots as $\psi_c' = \overline{\psi_c}$ when the combined available time slots have a total data transmission bandwidth less than a requested bandwidth, determining the OTSS connection for a different available path; and when the combined available time slots have the total data transmission bandwidth equal to or greater than the requested bandwidth, determining start/end time of one or more groups of periodic time slots to be occupied on each wavelength link of the available path;

and establishing the OTSS connection by the source node;

transmitting data streams using the start/end time of one or more groups of periodic time slots to be occupied on each wavelength link to the destination node via the OTSS connection by the source node, wherein time domain periodic OTSS frames are used to transmit the data streams on the wavelength links; each OTSS frame comprises variable-length time slices and OTSS frames on a same wavelength link comprises same time slices; each group of periodic time slices constitute an OTSS sub-wavelength optical channel; each optical switching node switches time slices arriving at an input fiber port to an output fiber port by an optical switch controller.

2. The method according to claim 1, further comprising:
obtaining a time signal by each optical switching node from a time server to synchronize a local time of the optical switching node, wherein the time server determines the time signal via a satellite or a network.

3. The method according to claim 1, further comprising:
if a state of time slots on a wavelength link changes, transmitting information of the time slots within a period on the wavelength link throughout the optical network by optical switching nodes at each end of the wavelength link so as to determine time slots available to the OTSS connection according to a changed state of the time slots, wherein the information comprises start/end time of time slices, slot occupying/releasing and services carried on time slices.

4. The method according to claim 1, wherein establishing the OTSS connection comprises:
transmitting a message for reserving time slots and information on the available path, the available wavelength and the start/end time of one or more groups of periodic time slots to be occupied on each wavelength link of the available path to other optical switching nodes on the available path by the source node until the message is received by the destination node or a failure occurs;
after the message is received by the other optical switching nodes on the available path, reserving the periodic time slots by each optical switching node other than the destination node on the available path for the output fiber port connected to a next optical switching node on the available path according to the information on the available path, the available wavelength and the start/end time of one or more groups of periodic time slots to be occupied on each wavelength link of the available path, wherein reserved time slots are not allowed to be occupied by other connections within a reserved period;
after the message is received by the destination node, transmitting a confirming message on the available path by the destination node until the confirming message is received by the source node;
after receiving the confirming message, configuring the optical switch controller by each optical switching node other than the destination node on the available path, wherein configuring the optical switch controller comprises setting periodic switching points according to the start/end time of one or more groups of periodic time slots to be occupied on each wavelength link of the available path.

5. The method according to claim 4, wherein transmitting data streams to the destination node via the OTSS connection by the source node comprises:
recoding the data streams by the source node to obtain recoded data streams according to a line rate of a wavelength channel on the available path, wherein recoding the data streams comprises remodulating the data streams and assembling them into an OTSS sub-wavelength optical channel according to the start/end time of one or more groups of periodic time slots to be occupied on the first wavelength link of the available path;
transmitting the recoded data streams to a next optical switching node on the available path by the source node at the start time of one or more groups of periodic time slots to be occupied on the first wavelength link of the available path;
switching optical switches by each optical switching node on the available path at the switching points set by the optical switch controller to switch periodic time slices arriving at the input fiber port to the output fiber port.

6. The method according to claim 1, wherein determining the start/end time of one or more groups of periodic time slots to be occupied on each wavelength link of the available path comprises:
selecting one or more groups of periodic available time slots $\psi_o = \cup_{n=1}^{N}(t_n^{start}, t_n^{end})$ from the combined available time slots on the available path as one or more groups of periodic available time slots to be occupied on a first wavelength link of which a total data transmission bandwidth is greater than or equal to the requested bandwidth, where $t_n^{start}$, $t_n^{end}$ and N represent a start/end time of an $n^{th}$ available time slot on the first wavelength link and a number of available time slots on the first wavelength link respectively;
if there are more than one wavelength links on the available path, calculating start/end time of one or more groups of periodic time slots to be occupied on other wavelength links of the available path according to one or more groups of periodic available time slots to be occupied on the first wavelength link as:

$$t_{j_n}^{start} \leftarrow t_n^{start} + \sum_{k=1}^{j-1} T_d^k, t_{j_n}^{end} \leftarrow t_n^{end} + \sum_{k=1}^{j-1} T_d^k,$$

where $t_{j_n}^{start}$ and $t_{j_n}^{end}$ represent a start/end time of an $n^{th}$ available time slot on wavelength link $e_j$ respectively, $j=2 \sim H_2$, $H_2$ is a number of wavelength links of the available path and $T_d^k$ is a propagation delay of wavelength link $e_k$.

7. The method according to claim 1, wherein time slices are separated from each other by a guard time and the method further comprises:
when a time synchronization error or a propagation delay variation exceeds the guard time so that a conflict between time slices occurs, delaying the time slices by an apparatus in an electrical domain or an optical domain at output fiber ports of conflicting optical switching nodes.

8. A non-transitory computer readable storage medium, comprising a computer program stored thereon, which when executed by a system, configures the system to implement an all-optical time slice switching method based on time synchronization, the method comprising acts:
determining an OTSS connection between a source node and a destination node according to a state of time slots of an optical network, wherein the OTSS connection comprises wavelength links between adjacent optical switching nodes, wherein determining includes:
determining an available path between the source node and the destination node;
determining an available wavelength on the available path; and
determining combined available time slots on the available path, including:
for each wavelength link of the available path, defining a set of time slots occupied on the wavelength link according to the state of time slots on the wavelength link as $\psi_i = \cup_{k=1}^{K_i}(t_{i_k}^{start}, t_{i_k}^{end})$, where $\psi_i$ is the set of time slots occupied on wavelength link $e_i$, $t_{i_k}^{start}$ and $t_{i_k}^{end}$ represents a start/end time of a $k^{th}$ time slot occupied on wavelength link $e_i$ respectively and $K_i$ is a number of occupied time slots on wavelength link $e_i$;

obtaining a combined occupied time slots using a time-slice shift and combination algorithm by $H_1$-times iterations as:

$$\psi_i' = \cup_{k=1}^{K_i}(t_{i_k}^{start} - T_d^c, t_{i_k}^{end} - T_d^c); \quad (1)$$

$$\psi_c \leftarrow \psi_c \cup \psi_i'; \quad (2)$$

$$T_d^c \leftarrow T_d^c + T_d^i; \quad (3)$$

where $H_1$ is a number of wavelength links of the available path, $T_d^i$ is a propagation delay of wavelength link $e_i$, $\psi_c$ and $T_d^c$ represent the combined occupied time slots and an accumulative propagation delay respectively, the initial value of $\psi_c$ is an empty set and the initial value of $T_d^c$ is 0 and $i = 1 \sim H_1$;

obtaining the combined available time slots as $\psi_c' = \psi_c$ when the combined available time slots have a total data transmission bandwidth less than a requested bandwidth, determining the OTSS connection for a different available path; and when the combined available time slots have the total data transmission bandwidth equal to or greater than the requested bandwidth, determining start/end time of one or more groups of periodic time slots to be occupied on each wavelength link of the available path;

and establishing the OTSS connection by the source node;

transmitting data streams using the start/end time of one or more groups of periodic time slots to be occupied on each wavelength link to the destination node via the OTSS connection by the source node, wherein time domain periodic OTSS frames are used to transmit data streams on the wavelength links, wherein each OTSS frame comprises variable-length time slices and OTSS frames on a same wavelength link comprises same time slices, each group of periodic time slices constitute an OTSS sub-wavelength optical channel, and each optical switching node switches time slices arriving at an input fiber port to an output fiber port by an optical switch controller.

\* \* \* \* \*